United States Patent [19]

Canova et al.

[11] Patent Number: 4,814,407

[45] Date of Patent: Mar. 21, 1989

[54] COMPOSITION FOR WATERPROOFING SILICA-CERAMIC INSULATION BODIES

[75] Inventors: Levy A. Canova, Orange Park; Ralph J. DePasquale; Michael E. Wilson, both of Jacksonville, all of Fla.

[73] Assignee: PCR, Inc., Gainesville, Fla.

[21] Appl. No.: 944,830

[22] Filed: Dec. 22, 1986

Related U.S. Application Data

[63] Continuation-in-part of Ser. No. 731,978, May 8, 1985, Pat. No. 4,649,063.

[51] Int. Cl.$^4$ .............................................. C08G 77/06
[52] U.S. Cl. ...................................... 528/21; 528/28; 528/31
[58] Field of Search ............................ 528/28, 21, 31

[56] References Cited

U.S. PATENT DOCUMENTS

| | | | |
|---|---|---|---|
| 3,128,297 | 4/1964 | Kanner et al. | 528/21 X |
| 3,271,360 | 9/1966 | Williams | 528/21 X |
| 3,354,095 | 11/1967 | Burzynski et al. | 528/21 X |
| 4,342,796 | 8/1982 | Brown et al. | 427/314 X |
| 4,424,157 | 1/1984 | Chung | 528/21 X |
| 4,472,551 | 9/1984 | White et al. | 528/21 X |

FOREIGN PATENT DOCUMENTS

| | | | |
|---|---|---|---|
| 0500159 | 2/1954 | Canada | 528/21 |
| 59-066422 | 4/1984 | Japan | 528/21 |

*Primary Examiner*—Thurman K. Page
*Attorney, Agent, or Firm*—Hedman, Gibson, Costigan & Hoare

[57] ABSTRACT

There is provided a method and compositions for improving the resistance to absorption of water by a porous rigid sintered and pressed block of short staple amorphous silica fiber by distributing within the pores of said block an alkylalkoxysilane or a fluoroalkylalkoxysilane which is substantially free of deleterious halide. Halide may be reduced by special purification techniques or by netralization in situ with acid scavenger.

9 Claims, No Drawings

COMPOSITION FOR WATERPROOFING SILICA-CERAMIC INSULATION BODIES

RELATED APPLICATION

The application is a continuation in part of our co-pending application Ser. No. 731,978 filed May 8, 1985, now U.S. Pat. No. 4,649,063, dated Mar. 10, 1987.

This invention relates, as indicated, to a composition for waterproofing siliceous bodies, and more particularly to a composition for improving the resistance to absorption of water by a rigid, porous sintered and pressed block of short staple amorphous silica fiber, especially such blocks as are used or reusable space vehicles, e.g., a shuttle orbiter.

BACKGROUND OF THE INVENTION AND PRIOR ART

By now, knowledge of the space shuttle and its abilities to exit from the earth's atmosphere, enter an orbit of elective duration, perform various functions in space, re-enter the earth's atmosphere, land safely and be reconditioned for succeeding flights into space is widely known. It is also fairly generally known that the outer surface of the space shuttle is covered with heat resistant "tiles", and that from time to time difficulty has been experienced in various of these tiles coming loose from the shuttle surface and being lost. Beyond the foregoing and the media presentations of weightlessness and the spectacular takeoff and landing episodes, very little else is generally known.

In an article entitled "The Toughest Title Job Ever" by Robert L. Dotts, Donald M. Curry and Donald J. Tillian, printed in Chemtech for October 1984, pages 616–626, there is presented a very well written description of the nature and properties of the "Unique thermal protection system (TPS)" that enshrouds the entire outer skin of the space shuttle. As pointed out in the article, the thermal protection system is designed to function for 100 missions with minimal weight gain, maintenance, and refurbishment. The thermal protection system must operate successfully in a variety of environments. The system must be capable of maintaining during ascent and re-entry temperatures of the orbiter's structures below 350° F. The thermal protection system must also withstand launch acoustics, structural deflections and temperatures encountered in deep space as well as earth environments including salt spray, fog, wind, and rain. Different thermal protection materials are applied to different areas of the outer surface of the orbiter depending upon the conditions encountered in the various environments mentioned above. Three of the material systems used to protect the structure of the orbiter are reusable. Two of these systems are formed of a low density silica-ceramic insulation and the third material is a coated nylon felt system. The silica-ceramic tiles are classified as high temperature and low temperature reusable surface insulation, the primary difference between these two being in the nature of the surface coating. The high temperature tiles are coated with a black borosilicate glass, whereas the low temperature tiles are coated with a white borosilicate glass.

The basic silica-ceramic insulation material is manufactured in two densities, one at nine pounds per cubic foot and the other at twenty-two pounds per cubic foot. These materials together cover 70% of the orbiter structure. Most of the area is covered with the lower density material whereas the higher density material is used in areas where a more durable material is necessary. The silica-ceramic material is formed from a short-staple 99.6% pure amorphous silica fibers which are slurried, felted, pressed and sintered to form rigid blocks of insulation material. The individual tiles are then cut from the blocks of insulation material to predetermine size. Ordinarily, the blocks are approximately 6 inches by 6 inches by 1 inch with outer surfaces which are planar. Geometry of the vehicle determines, of course, the shape of other tiles.

To provide a barrier to moisture absorption, the tiles are coated with a borosilicate glass. Those tiles which are adapted to high tempeature surfaces have a coating that contains a black pigment (silicontetraboride).

After coating, the tiles are rendered water repellent to prevent water absorption into the low density insulation. Thereafter the tile remains water repellant until exposed to the high temperatures of reentry.

The tiles are bonded to the outer surface of the orbiter using a polysilicone adhesive and an intervening layer of nylon felt. Although the silica-ceramic tile is a highly effective insulator, it is nevertheless ceramic and possesses low mechanical strength. To prevent damage to the tiles by flexure of the airframe and consequent induction of stresses in the tile, the nylon felt material is used to isolate such strains and prevent damage to the individual tiles. Gaps between the individual tiles are filled with a suitable spacer material.

As pointed out in the aforesaid article, a major technical problem encountered in the flight testing program has been keeping moisture out of the tile. Further details of the moisture absorption characteristics of the orbiter's thermal protection system are founded in the article by Schomburg, Dotts, and Tillian entitled "Moisture Absorption Characteristics of the Orbiter Thermal Protection System and Methods Used to Prevent Water Ingestion", Intersociety Conference on Environmental Systems, July 11-15, 1983.

The present invention has for a primary object the enhancement of the resistance to absorption of water by the silica-ceramic tiles. It has been found that organic silane compositions which have been modified to remove or neutralize substantially completely deleterious impurities in said compositions or the tile to be waterproofed are especially effective to the accomplishment of the foregoing ends.

BRIEF STATEMENT OF THE INVENTION

Briefly stated, the present invention is in a composition for improving the resistance to absorption of water by a porous rigid sintered and pressed body of short staple amorphous silica fiber which comprises an alkylalkoxysilane substantially free of deleterious halide and having the following general formula:

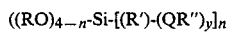

$$((RO)_{4-n}\text{-Si-}[(R')\text{-}(QR'')_y]_n)$$

wherein R is an alkyl group of fluorine substituted alkyl group containing from 1 to 3 carbon atoms, R' at each occurrence thereof is independently selected from hydrogen, or aryl, or alkyl, or alkylene, or fluorine substituted alkyl or alkylene group containing from 2 to 10 carbon atoms, R" is an alkyl group or fluorine substituted alkyl group containing from 2 to 4 carbon atoms, n is 1 or 2, y is 0 or 1, and when y is 1, R' is alklene or fluorine substituted alklene containing from 2 to 10 carbon atoms. A heteroatom, Q, may be present in the alkyl substituent attached to silicon such as O, N, or S.

DETAILED DESCRIPTION OF THE INVENTION

The use of alkoxysilanes as agents to decrease the absorption of water through porous bodies, particularly ceramic bodies (U.S. Pat. No. 2,774,690, U.S. Pat. No. 2,893,898 and numerous others) is well known. The silanes of commerce today are usually produced by using as a principal reactant, trichlorosilane. This material can be reacted directly with alcohol to produce a trialkoxysilanehydride, or with an unsaturated hydrocarbon to attach an alkyl group directly to silicon through a silicon-carbon bond. Thereafter, the alkyltrichlorosilane may be reacted with a material such as methyl alcohol or ethyl alcohol, for example, to form the corresponding alkoxysilanes. Various modifications of these procedures are well known.

It has been found that residual chloride remaining after the preparation of commercial examples of these silanes is detrimental to the waterproofing efficacy of the silane in the tiles. It has also been found that heavy metals such as titanium which may be used in the formation of the silane at one or another stage also interfere adversely with the performance of the titles. Commercial preparations of various silanes may contain impurities of the type described, particularly chloride, to the extent of more than 1,000 ppm of chloride. Unless the content of these impurities is reduced below about 50 ppm, and preferably less than 20 ppm, the performance of the tiles tends to be unsatisfactory. For example, with isobutyltrimethoxysilane containing less than 15 ppm chloride exceptionally satisfactory results have been obtained when using this material as a moisture resistance improving agent.

A material which has been used in the past in waterproofing silica-ceramic tiles for an orbiter device is hexamethyldisilazane (HMDS). This material when injected into the center of the tile and distributed throughout the tile body provides good water resistance. However, upon decomposition, the material yields ammonia which apparently has an advantage effect and causes reversion of the siloxane polymer adhesive. The balance of the molecule acts as an endcapper and prevents reformation of the polymer which would otherwise occur. The reaction thus causes an irreversible softening of the adhesive which can be related to adhesive failure. While the alkalkoxysilane does not yield such a deleterious substance, the presence of chloride and the presence of a heavy metal such as titanium were found to be deleterious.

In general, the silanes used as waterproofing agents should have a boiling point above about 50° C. and below about 250° C., and preferably in the range from 100° C. to 160° C. at atmospheric pressure. Thus, these are normally liquid materials and are readily amenable to the present method of effecting waterproofing of the silica-ceramic tiles. This is accomplished by injecting through a hypodermic needle from 0.5 to 6 ml of the waterproofing agent into the center of the tile. By maintaining the tile at ambient temperature, the silane diffuses to all parts of the tile. Usually 24 hours is sufficient but the time may be as long as 72 to 96 hours. Other methods of introducing the silane are possible, e.g., maintaining a vapor of the silane in contact with the tiles.

It becomes convenient at this point to give specific examples of silanes useful in carrying out this invention. These are for illustrative purposes only, and those skilled in the art are aware of the desired properties given above will be able to suggest other silanes of equal utility for use herein.

Ethyltriethoxysilane
Propyltriethoxysilane
Propylmethyldiethoxysilane
Propyldiethylethoxysilane
n-butyltrimethoxysilane
Isobutyltrimethoxysilane (best known material)
Isobutyltriethoxysilane
Isobutyldiethoxysilane
Cyclohexyltrimethoxysilane
Cyclobutyltriethoxysilane
Ethoxypropyltrimethoxysilane
Methoxypropyltrimethoxysilane
Propoxyethyldimethoxymethylsilane
Diisopropyldimethoxysilane
Vinyltriethoxysilane
Vinyltrimethoxysilane
p-menthenetrimethoxysilane
Phenyltrimethoxysilane
Pentenyltrimethoxysilane
Isoamylenetrimethoxysilane
Diethylethoxysilane
Dimethylethoxysilane
Dipropylmethoxysilane For best results the foregoing silanes should have chloride contents less than 50 ppm, and preferably less than 20 ppm.

All of the silanes disclosed herein can be used in the tile injecting waterproofing step in neat condition or in the presence of a suitable low boiling (e.g., less than 150° C.) solvent, e.g., alcohol, ketone, hydrocarbon, (e.g., heptane).

Specific examples of normally liquid fluorine containing compounds useful in the present invention include the following:

3,3,3-trifluoropropyltrimethoxysilane
3,3,3-trifluoropropylmethyldimethoxysilane
3,3,3-trifluoropropyldimethylmethoxysilane
3,3,3-trifluoropropylmethylmethoxysilane
3,3,3-trifluoropropylmethylethoxysilane
3,3,3-trifluoropropyldimethylethoxysilane
3,3,3-trifluoropropylethyldimethoxysilane
3,3,3-trifluoropropyldiethoxysilane
3,3,3-trifluoropropyldi-(2,2,1-trifluoroethoxy)silane
2-heptafluorocyclobutylethyldimethoxysilane
2-heptafluorocyclobutylethylmethyldimethoxysilane
2-heptafluorocyclobutylethyldimethylmethoxysilane
3-heptafluoroisopropoxypropyltrimethoxysilane
3-heptafluoroisopropoxypropylmethylmethoxysilane
3-heptafluoroisopropoxypropyldimethylmethoxysilane
3,3,4,4,4-pentafluorobutyltrimethoxysilane
3,3,4,4,4-pentafluorobutyldimethylmethoxysilane
3,3,4,4,4-pentafluorobutylmethylmethoxysilane Numerous other examples will become clear to those skilled in the art from the foregoing examples. As a further guide, the useful fluoroalkylalkoxysilanes have the following general formula:

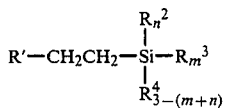

wherein R' is selected from CF$_3$, C$_2$F$_5$, cycloC$_4$F$_7$, and (CF$_3$)$_2$CFO-CH$_2$; R$^2$ is selected from hydrogen and C$_1$-C$_3$ alkane; R$^3$ is selected from hydrogen and C$_1$-C$_3$ alkane, R$^4$ is selected from 0-(C$_1$-C$_3$) alkyl, and OCH$_3$CF$_3$; m is 0, 1, or 2; n is 0, 1, or 2; and m+n is 0, 1, or 2. These materials may be used to waterproof silica-ceramic tiles in exactly the same manner as the preferred alkyalkoxysilanes.

The active waterproofing agents of the present invention are conveniently prepared from a halosilane containing one to three chlorine or other halogen atoms directly connected to silicon, e.g., HSiCl$_3$. Esterification with alcohol such as methyl alcohol, ethyl alcohol or isopropyl alcohol to introduce one or more alkoxy groups usually leaves residual chloride in the product. While the amount of such chloride is very small less than about 0.3% by weight, such amounts as are normally present have been found to be very deleterious to the coatings, especially the polysiloxane adhesives on the tiles. This can be responsible for loss of adhesion under the environments encountered by the orbiter. Loss of tiles is then encountered which can be very damaging on reentry and dangerous to the occupants.

There are two principal ways we have found by which the deleterious effect of chloride in the waterproofing agents hereof can be counteracted. In the first case, we have found that if we chemically remove adventitious halide, e.g., chloride, by treatment with an alkali metal alkoxide, e.g., sodium methoxide, the halide content, which normally ranges about 500 ppm to as high as 3000 ppm or more can be reduced to less than 50 ppm, and preferably less than 20 ppm. When the silane waterproofing agent contains no more than 50 ppm and preferably no more than 20 ppm halide, excellent results are obtained with the tiles in terms of resistance to absorption of water.

Another method which has been, found for nullifying the deleterious effects of halide in the silane waterproofing agents hereof is to chemically tie up advantageous halide by blending into the silane prior to injection into the tile up to 5% by weight of the silane, and preferably from 1% to 3% by weight, of an organic base, usually an organic amine. 2% by weight of triethylamine, for example, gives excellent results.

The following specific examples illustrates a simple and preferred procedure for decreasing halide content of silane.

EXAMPLE I

An initial attempt to remove chlorides from commerical isobutyltrimethoxysilane, Prosil 178, a product of SCM Specialty Products, by fractionation was unsuccessful. Two fractionations at 11:1 reflux ratio reduced the chloride level to a minimum of 237 ppm. One of the fractions containing 339 ppm chloride was stirred at 50° C. for four hours with 3.7% by weight of sodium methoxide. The reacted material was strip distilled at atmospheric pressure to give a product with 13.1 ppm chloride. This procedure was repeated with a larger sample. This time the material was stirred at 100° C. for three hours with 2.3% sodium methoxide before strip distilling. The heat cut of the isobutyltrimethoxysilane contained 14.1 ppm chloride. This sample was used to waterproof a test tile described below.

It was attempted to remove chlorides from a larger amount of Prosil 178 without doing a preliminary fractionation. Treatment with sodium methoxide for two hours followed by strip distillation gave a product with 302 ppm chloride.

EXAMPLE II

A batch of Prosil 178 was fractionated and a 140 gm fraction treated with 3 gm sodium methoxide at 100° C. for two hours. The chloride level in the distilled product was 19 to 26 ppm (initially 160).

EXAMPLE III

It was found that addition of methanol to the mixture of sodium methoxide and Prosil 178 produced a very low chloride content. A 438 gm sample of distilled Prosil 178 (chloride=612 ppm) was stirred three hours at 100° C. with 4.3 gm sodium methoxide and 2.2 gm anhydrous methanol. Strip distillation gave material with 8 ppm chloride.

A 3,058 gm charge of Prosil 178 was fractionated after heating with 31 gm sodium methoxide and 15 gm anhydrous methanol. Cuts 5–8 were blended to produce 1,446 gm that contained 13.7 ppm chloride. This process combines fractination and treatment with sodium methoxide. This is the best mode known to us and we would use it for commercial production of low chloride Prosil 178 (isobutyltrimethoxysilane). Other chloride sequestering agents, e.g., silver nitrate, sodium acetate, sodium metal, sodium carbonate, sodium/potassium alloy, etc., are well known and may be used with equal effect. Organic agents may also be used, e.g., organic epoxides.

The product of Example I containing 14.1 ppm Cl was tested as follows on virgin silica-ceramic space shuttle tiles 6"×6"×1".

Virgin tiles coated with borosilicate glass were used in testing silane candidates. It was desired to compare the waterproofing efficiency of Prosil 178 having a typical chloride level (1,000 ppm) with a highly purified, low chloride, Prosil 178. Tiles were injected in the center of the 6"×6" face to a depth of 0.25 to 0.5 inch, with 1 ml of each sample. To our surprise, the low-chloride material was a much better waterproofing agent than the typical high chloride material. Waterproofing efficiency was determined by immersion of tiles in an aqueous solution of methylene blue for five minutes and weighing to determine the weight increase.

| PROSIL: SAMPLE CODE | PPM Cl | % WT. INCREASE |
| --- | --- | --- |
| Commerical Prosil 178 | 1483 | 4.3 to 5.0 |
| Example I | 14.1 | 1.0 to 1.3 |

The tile treated with Example I was completely waterproofed except for two corners. The high chloride Prosil 178 left a blue area about 1¾" in diameter around the point of injection and was unacceptable.

Specific illustrative examples of acid scavangers useful herein are as follows:
ethylene diamine
dipropylamine
isopropanolamine
amylamine
monoethanolamine aniline
methylaminobenzene
hexylamine
cyclohexylamine
octylamine
2-ethyl-1-aminohexane
triethylamine (best known example)
tetramethyldisilazane
ammonia
diethylaminotrimethylsilane
propylene oxide
alloocimene
alpha-methylstyrene
isobutylene
methylisocyanate.

A specific example of an exceptionally successful waterproofing agent is 98 low chloride isobutyltrimethoxysilane and 2% triethylamine. Another exceptional example is 98 isobutyltrimethoxysilane and 2% tetramethyldisilazane. Still another example is 97.5% trifluropropyltrimethoxysilane and 2.5% triethylamine. Another example is 98% high chloride isobutyltrimethoxysilane and 2% triethylamine.

It should be noted that mixtures of the foregoing silanes may be used as waterproofing agents with or without added acid scavengers.

While the previous disclosure has been directed primarily to alkoxy grous as the hydrolyzable groups, other such groups may replace part or all of the alkoxy groups. For example, there may be present acetate, oximino, thioalkoxy, trifluoroacetate, dialkylamino, etc.

By "substantially free of deleterious halide" as used herein and in the appended claims is meant that the chloride has either been removed as described above, or rendered innocuous in the system by the addition of a small amount of an acid scavenging agent or a combination of both.

What is claimed is:

1. A composition of matter comsisting essentially of (a) a silane having the general formula:

$$(RO)_{4-n}\text{-Si-}((R')\text{-}(QR'')_y)_n$$

wherein R is an alkyl group or fluorine substituted alkyl group containing from 1 to 3 carbon atoms, each occurrence of R' is independently selected from hydrogen, or aryl, or alkyl, or alkylene, or fluorine substituted alkyl or alkylene group containing from 2 to 10 carbon atoms, R" is an alkyl group or fluorine substituted alkyl group containing from 2 to 4 carbon atoms, Q is oxygen, nitrogen, or sulfur, n is 1 or 2, y is 0 or 1, and when y is 1, R' is alkylene or fluorine substituted alkylene containing from 2 to 10 carbon atoms and (b) up to 5.0% by weight of an acid scavenging agent having a boiling point at atmospheric pressure of up to about 200° C.

2. A composition as defined in claim 1 wherein the silane is isobutyltrimethoxysilane.

3. A composition as defined in claim 1 wherein the acid scavenging agent is a trialkylamine.

4. A composition as defined in claim 1 wherein the acid scavenging agent is triethylamine.

5. A composition as defined in claim 1 wherein the acid scavenging agent is tetramethyldisilazane.

6. A composition of matter consisting of about 98% by weight isobutyltrimethoxysilane and about 2% by weight of triethylamine.

7. A composition as defined in claim 1 wherein the silane is isobutyltriethoxysilane.

8. A composition as defined in claim 1 wherein the silane is dimethylethoxysilane.

9. A composition as defined in claim 1 wherein said acid scavenging agent is selected from ethylene diamine, dipropylamine, isopropanolamine, amylamine, monoethanolamine, aniline, methylaminobenzene, hexylamine, cyclohexylamine, octylamine, 2-ethyl-1-aminohexane, triethylamine, tetramethyldisilazane, ammonia, diethylaminotrimethylsilane, propylene oxide, alloocimene, alpha-methylstyrene, isobutylene, methylisocyanate or a mixture of any of the foregoing.

* * * * *